(12) United States Patent
Chang et al.

(10) Patent No.: US 12,179,672 B2
(45) Date of Patent: Dec. 31, 2024

(54) ENERGY ABSORBING STRUCTURE FOR VEHICLE-MOUNTED DISPLAY SCREEN AND DISPLAY SCREEN USING THE SAME

(71) Applicants: Futaijing Precision Electronics (Yantai) Co., Ltd., Yantai (CN); HON HAI PRECISION INDUSTRY CO., LTD., New Taipei (TW)

(72) Inventors: Yu-Sheng Chang, New Taipei (TW); Chi-Cheng Wen, New Taipei (TW); Chih-Cheng Lee, New Taipei (TW); Wen-Bin Huang, New Taipei (TW); Tsung-Hsin Wu, New Taipei (TW); Yu-Chih Cheng, New Taipei (TW); Hsiu-Fu Li, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 327 days.

(21) Appl. No.: 17/886,915

(22) Filed: Aug. 12, 2022

(65) Prior Publication Data
US 2023/0311781 A1  Oct. 5, 2023

(30) Foreign Application Priority Data
Mar. 30, 2022 (CN) .......................... 202210327242.6

(51) Int. Cl.
*B60R 11/02* (2006.01)
*B60R 11/00* (2006.01)
*F16F 7/00* (2006.01)

(52) U.S. Cl.
CPC .......... *B60R 11/0229* (2013.01); *F16F 7/003* (2013.01); *B60R 2011/0059* (2013.01); *B60R 2011/0066* (2013.01); *F16F 2230/0023* (2013.01)

(58) Field of Classification Search
None
See application file for complete search history.

(56) References Cited

U.S. PATENT DOCUMENTS

2006/0028038 A1\*  2/2006  Glasgow ................. F16F 7/125
293/132

FOREIGN PATENT DOCUMENTS

| CN | 104797973 A | 7/2015 |
| TW | M478636 U | 5/2014 |
| WO | 2009034097 | * 3/2009 |

\* cited by examiner

*Primary Examiner* — Ashok Patel
(74) *Attorney, Agent, or Firm* — ScienBiziP, P.C.

(57) ABSTRACT

An energy absorbing structure comprises a first connecting member, a second connecting member, a brittle connecting member and an elastic buffering element. The first connecting member comprises a first end portion, and the first end portion defines a first accommodating cavity. The second connecting member comprise a second end portion, the second end portion defines a second accommodating cavity, and the first accommodating cavity communicates with the second accommodating cavity to form a telescopic cavity. The first connecting member and the second connecting member are connected by the brittle connecting member, the brittle connecting member is configured for breaking during a collision to absorb the energy generated by the collision. The elastic buffering element is arranged in the telescopic cavity, and the elastic buffering element is configured to be compressed by the first connecting member and the second connecting element together to deform and absorb energy during a collision.

18 Claims, 5 Drawing Sheets

ENERGY ABSORBING STRUCTURE FOR VEHICLE-MOUNTED DISPLAY SCREEN AND DISPLAY SCREEN USING THE SAME

FIELD

The present application relates to the field of vehicle-mounted products, and in particular, to an energy-absorbing structure and a display screen using the same.

BACKGROUND

A car can be equipped with a display screen, for car navigation, multimedia audio, and video entertainment etc. The display screen can be used for various service functions, such as navigation, movie screening or game entertainment.

When the vehicle crashes, the display screen may be damaged by the impact. In the prior art, the display screen generally lacks a safety protection structure and this may be dangerous for the passengers in the vehicle.

DETAILED DESCRIPTION

The following descriptions refer to the attached drawings for a more comprehensive description of this application. Sample embodiments of this application are shown in the attached drawings. However, this application can be implemented in many different forms and should not be construed as limited to exemplary embodiments set forth herein. These exemplary embodiments are provided to make this application thorough and complete, and to adequately communicate the scope of this application to those skilled in the field. Similar diagram labels represent the same or similar components.

The terms used herein are intended only to describe the purpose of particular exemplary embodiments and are not intended to limit this application. As used herein, the singular forms "one", "one" and "the" are intended to include the plural as well, unless the context otherwise clearly indicates it. In addition, when used herein, the words "include" and/or "include" and/or "have", integers, steps, operations, components and/or components, without excluding the existence or addition of one or more other features, regions, integers, steps, operations, components, components and/or groups thereof.

Unless otherwise defined, all terms used herein (including technical and scientific terms) have the same meaning as would normally be understood by ordinary technicians in the field of this application. In addition, unless expressly defined in the context, terms such as those defined in a general dictionary shall be construed to have meanings consistent with those in the relevant technology and in the content of this application, and shall not be construed to have idealistic or overly formal meanings.

Examples of embodiments are described below in combination with the attached drawings. It should be noted that the components depicted in the attached drawings may not be shown to scale; The same or similar components will be assigned the same or similar drawing mark representation or similar technical terms.

The following is a detailed description of the specific implementation of this application by referring to the attached drawings.

Figure 1:
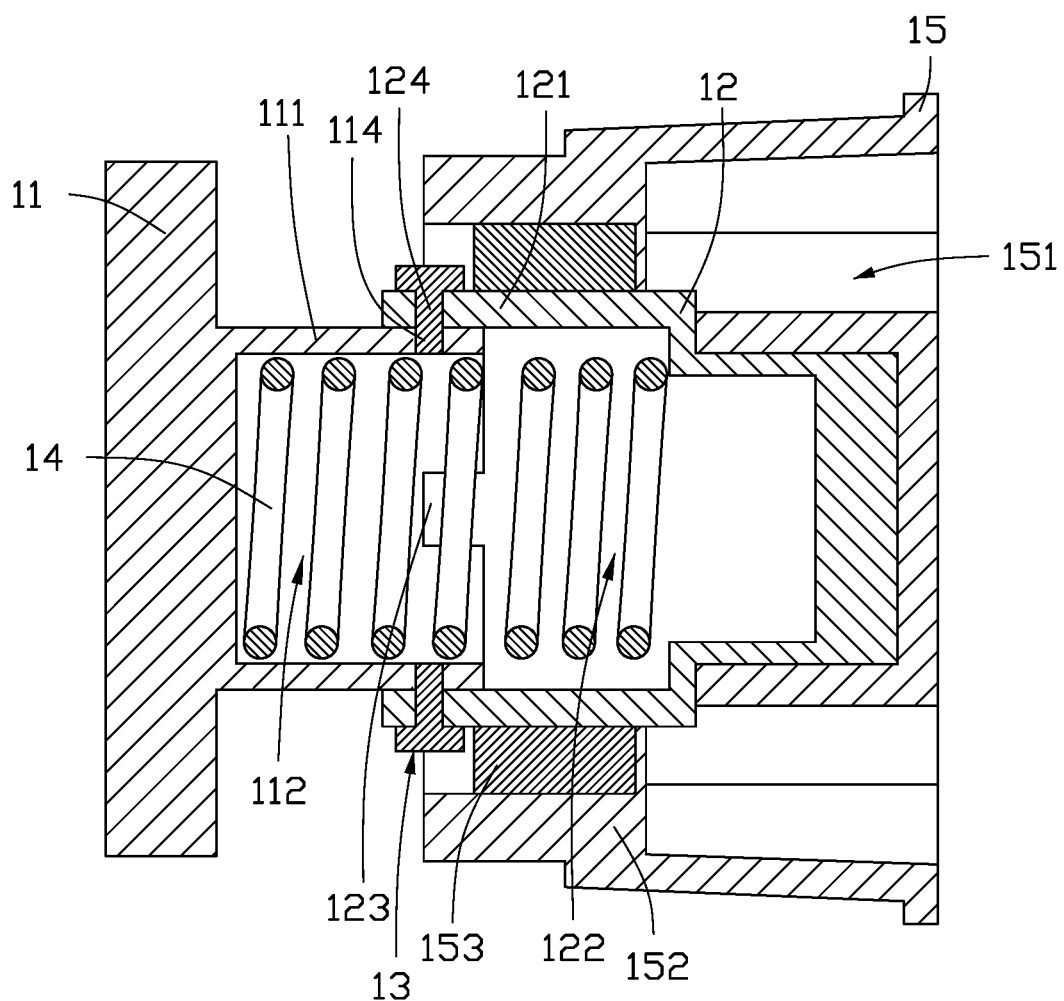
FIG. 1 is a view of an energy absorbing structure.
Figure 2:
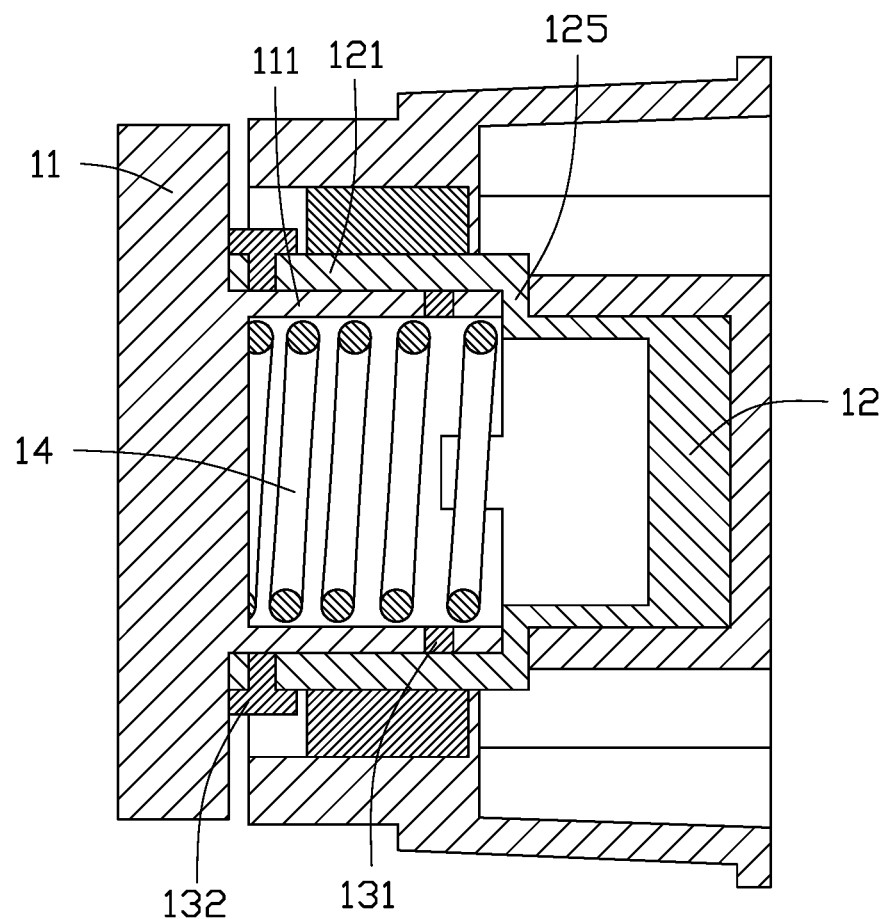
FIG. 2 is a schematic structural diagram of the energy absorbing structure of FIG. 1 when collapsed.
Figure 3:
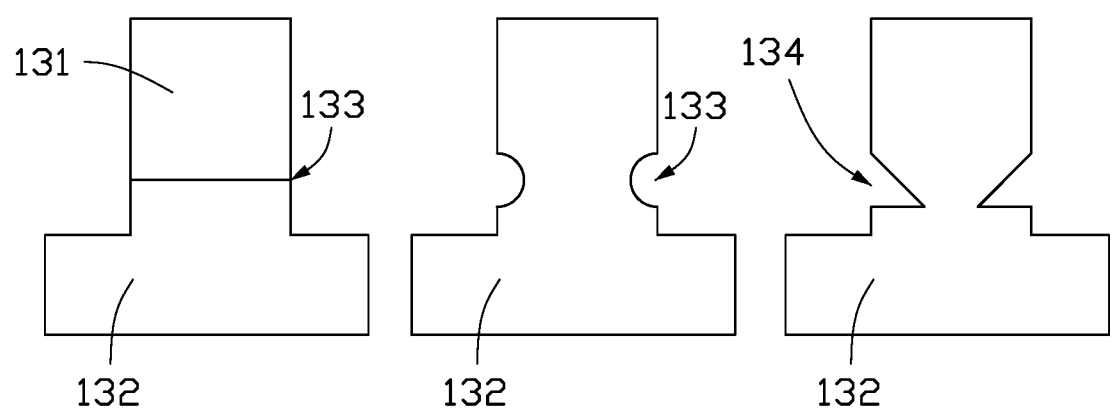
FIG. 3 is a schematic structural diagram of a brittle connecting member of the energy absorbing structure of FIG. 1.
Figure 4:
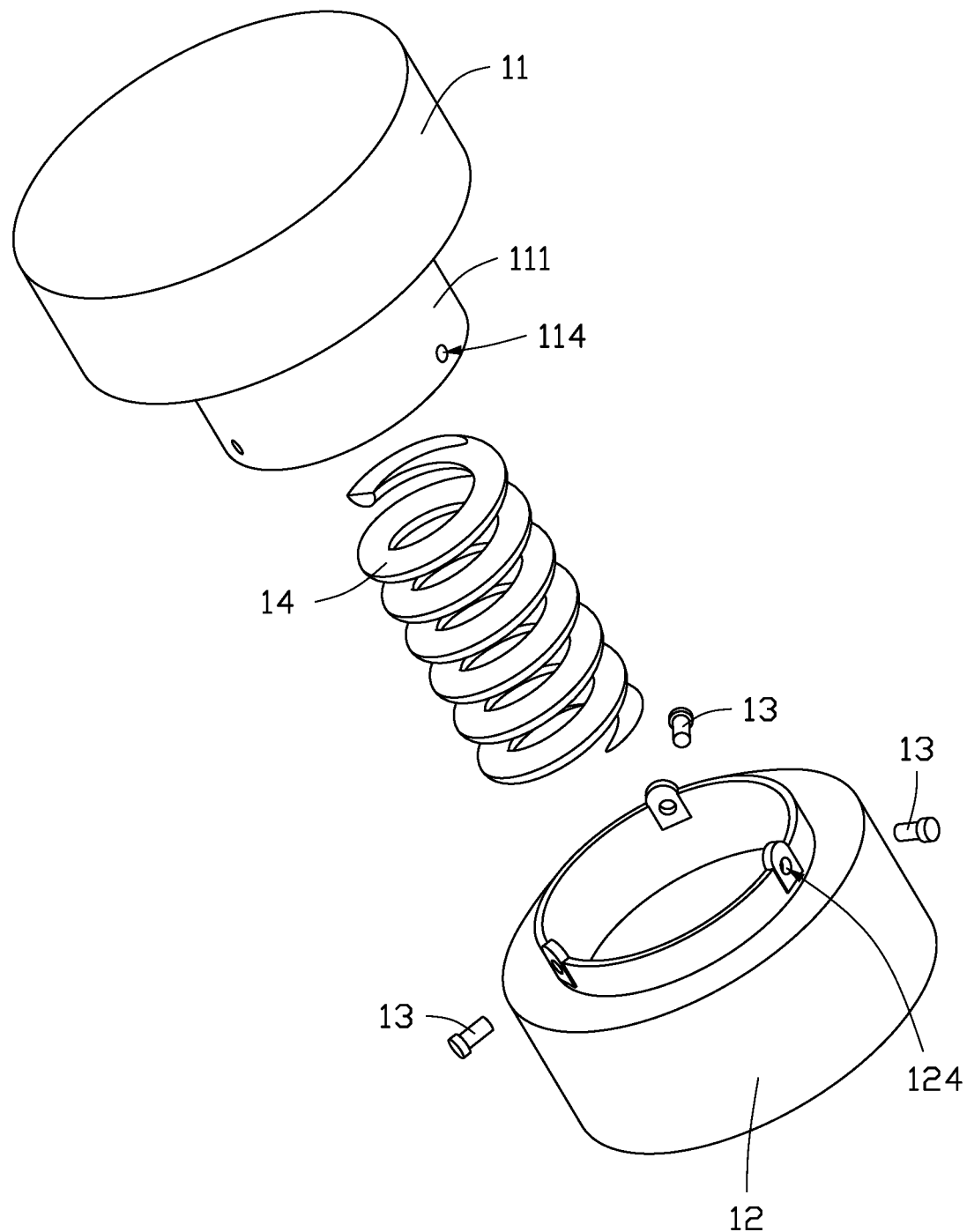
FIG. 4 is a schematic perspective view of the energy absorbing structure of FIG. 1.
Figure 5:
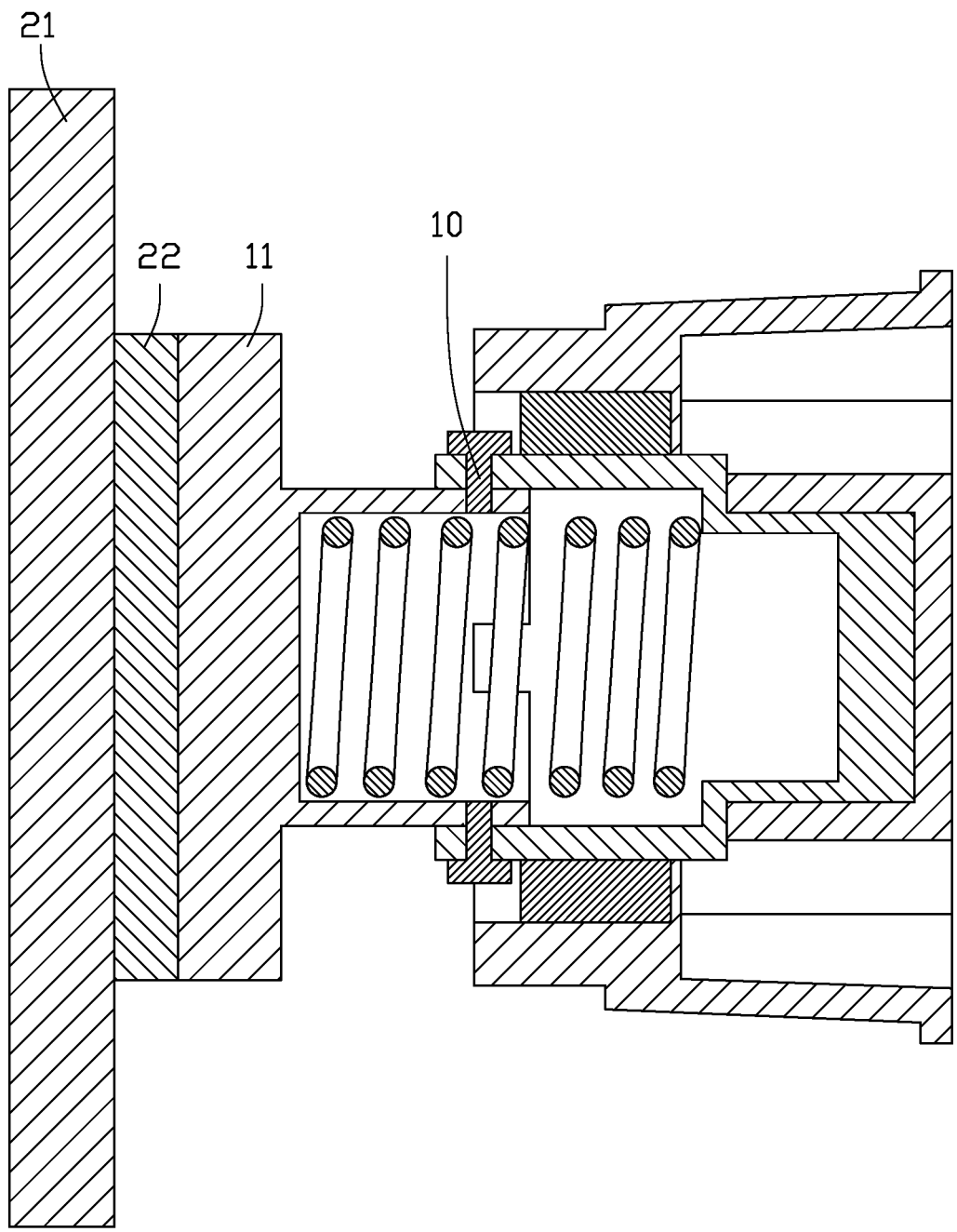
FIG. 5 is a view of a display screen when mounted.

As shown in FIG. 1 to FIG. 5, an energy absorbing structure 10 includes: a first connecting member 11, a second connecting member 12, a brittle connecting member 13, an elastic buffer piece 14, and a base 15. The first connecting member 11 includes a first end portion 111, and the first end portion 111 defines a first accommodating cavity 112. The second connecting member 12 includes a second end portion 121, and the second end portion 121 defines a second accommodating cavity 122. The first connecting member 11 is connected to the second connecting member 12, the first end portion 111 is at least partially disposed in the second end portion 121, and the first accommodating cavity 112 communicates with the second accommodating cavity 122 to form a telescopic cavity 123. The first connecting member 11 and the second connecting member 12 are connected by a brittle connecting member 13. The brittle connecting member 13 is intended to fracture upon impact, to absorb energy. The elastic buffer member 14 is arranged in the telescopic cavity 123. The elastic buffer member 14 can be compressed and deformed by the first connecting member 11 and the second connecting member 12, to absorb energy during collision.

Further, the energy absorbing structure 10 includes a brittle connecting member 13 and an elastic buffer member 14. In the event of a collision, the fracture of the brittle connecting member 13 converts kinetic energy into fracture energy. The first connecting member 11 loses the fixed connection of the brittle connecting member 13, and the first connecting member 11 and moves towards the second connecting member 12 in the telescopic cavity 123. The first connecting member 11 compresses the elastic buffer member 14, and the elastic buffer member 14 deforms to convert kinetic energy into potential energy. The brittle connecting member 13 and the elastic buffer member 14 absorb impact energy, so as to achieve the effect of energy absorption and buffering.

In this embodiment, the first end portion 111 can perform telescopic motion in the telescopic cavity 123. In the initial state, the first end portion 111 and the second end portion 121 are fixed by the brittle connecting member 13, the telescopic cavity 123 is fixed to form a certain space, and the elastic buffer 14 is arranged in the telescopic cavity 123. In the collapsed state, the fracturing of the brittle connecting member 13 requires substantial energy, and the fracture of the brittle connecting member 13 absorbs part of the kinetic energy. In a collision, the fixed connection between the first end portion 111 and the second end portion 121 is lost, the first connecting member 11 moves toward the second connecting member 12 along the inner wall of the telescopic cavity 123, and the first connecting member 11 compresses the elastic buffer member 14. The deformation of the elastic buffer member 14 converts kinetic energy into potential energy, and further absorbs the residual kinetic energy. The brittle connecting member 13 and the elastic buffer member 14 absorb impact energy, so as to achieve the effect of energy absorption and buffering.

In one embodiment, the brittle connecting member 13 is disposed at the connection between the first connecting element 11 and the second connecting element 12, and the brittle connecting member 13 includes the connected first segment 131 and the second segment 132. The first segment 131 is connected to the first connecting member 11, and the second segment 132 is connected to the second connecting member 12. The fracture area 133 is the area where the first segment 131 and the second segment 132 are connected.

In one embodiment, the compressive strength of the fractured area 133 is lower than the compressive strength of other areas of the brittle connecting member 13 except in the fractured area 133.

In one embodiment, the thickness of the fracture area 133 is smaller than the thickness of other areas of the brittle connecting member 13.

In one embodiment, the brittle connecting member 13 is provided with a stress groove 134, and the stress groove 134 is provided in the fracture area 133.

Further, when the fracture area 133 experiences a fracture, the kinetic energy is converted into fracture energy, so as to achieve energy absorption. The fracture area 133 can be formed in various ways. The strength of the fracture area 133 may be lower than the strength of the non-fracture area 133 of the brittle connecting member 13, or the thickness of the fracture area 133 is reduced and the strength thereby reduced, or the stress of the fracture area 133 is concentrated and the strength thereby reduced. The strength of the fractured area 133 is smaller than that of other areas of the brittle connecting member 13, so when the energy absorbing structure 10 is subjected to impact, the fractured area 133 is more prone to fracture than other areas, and the fractured area 133 converts kinetic energy into fracture energy to absorb energy.

In this embodiment, there are three ways to set the fracture area 133 in the brittle connecting member 13. The first way is that the first segment 131 and the second segment 132 are bonded together using different materials, and the fracture area 133 is provided at the bonding place of the first segment 131 and the second segment 132, and the connection force of the fracture area 133 is less than the connecting force of the non-fractured area 133 of the brittle connecting member 13.

The second method is that the first segment 131 and the second segment 132 are integrally formed using the same material, and the width of the fractured area 133 is smaller than the width of the non-fractured area 133 of the brittle connecting member 13, so that the material becomes thinner and weaker, and the strength of the fractured area 133 is thereby less than the strength of the non-fractured area 133 of the brittle connecting member 13.

The third method is that the first segment 131 and the second segment 132 are integrally formed with brittle materials, and the stress groove 134 is provided in the fracture area 133. The change of the cross-sectional size of the stress groove 134 increases local stress in the fracture area 133 during an impact, and the stress concentration causes the stress of the groove 134 to be less than the strength of the non-fractured area 133 of the brittle connecting member 13.

Through the above three methods, the compression resistance of the fracture area 133 is lower than the compression resistance of the other areas of the brittle connecting member 13, so that the fracture area 133 is fractured first, and the fracture area 133 converts kinetic energy into fracture energy to absorb energy.

In one embodiment, the second connecting member 12 further includes a limiting structure 125. The limiting structure 125 is disposed on the side of the second end portion 121 away from the first connecting member 11 and is fixed to the second end portion 121. The limiting structure 125 is arranged in the telescopic cavity 123 for blocking the first end portion 111.

Further, in being fractured, the fracture area 133 will absorb part of the impact energy, and the elastic buffer 14 further absorbs residual impact energy. When the elastic buffer member 14 is deformed to the maximum, the first end portion 111 is blocked by the limiting structure 125, so that the movement of the first connecting member 11 is stopped, so as to stop further collapse.

In this embodiment, the limiting structure 125 is a step in which the radial cross-sectional dimension of the second connecting member 12 is reduced, and the first end portion 111 moves toward the second connecting member 12. When the first end portion 111 reaches the stepped surface, the stepped surface blocks further movement of the first end portion 111. After the brittle connecting member 13 is completely broken to absorb part of the impact energy, the residual impact energy is absorbed by the elastic buffer member 14. When the deformation of the elastic buffer member 14 reaches the maximum, the first end portion 111 is blocked by the limit structure 125 and further movement of the first link 11 is stopped.

In one embodiment, the base 15 is provided with a cavity 151, an inner surface of the cavity 151 is provided with a clamping structure 152, and the second connecting member 12 is fixedly connected with the clamping structure 152, or can be movably connected through a bearing 153.

Further, the second connecting member 12 is fixed by the base 15, or the second connecting member 12 is rotatable by the bearing 153, so that the energy absorbing structure 10 can be rotated, so as to allow the energy absorbing structure 10 to be suitable for more products and greater applicability.

In this embodiment, the base 15 is fixedly arranged, the outer surface of the bearing 153 is fixedly connected to the base 15, and the inner surface of the bearing 153 is sleeved on the outer surface of the second connecting member 12. The inner surface and the outer surface of the bearing 153 can rotate relative to each other, so that the second connecting member 12 and the base 15 are rotatably connected through the bearing 153, and the bearing 153 gives the second connecting member 12 a degree of rotational freedom.

A plurality of brittle connecting members 13 are distributed at the connection between the first connecting member 11 and the second connecting member 12.

Further, when impacted, all the brittle connecting members 13 are simultaneously fractured, and the brittle connecting members 13 uniformly convert kinetic energy into fracture energy, so as to balance the impact force and achieve a good collapse energy absorption effect.

In one embodiment, the first end portion 111 is provided with a first connection hole 114, the second end portion 121 is provided with a second connection hole 124. The first connection hole 114 is in communication with the second connection hole 124. The brittle connection member 13 is positioned in the first connection hole 114 and the second connection hole 124. The brittle connection member 13 may be plastic screw, and the elastic buffer member 14 may be spring.

Further, the brittle connecting member 13 is a plastic screw, and the elastic buffer member 14 is a spring. When impacted, the brittle connecting member 13 breaks and absorbs part of the energy, the first end portion 111 and the second end portion 121 lose the fixed connection, the remaining energy moves the first end portion 111 toward the second connecting member 12, and the elastic buffer 14 is blocked. The first end portion 111 and the second connecting member 12 are compressed to absorb the remaining energy. Using plastic screws and springs is a preferred way of absorbing energy, but energy absorption is not limited to this, and there are many other ways of absorbing energy.

In this embodiment, three groups of brittle connecting members 13 are arranged evenly and distributed on the periphery of the connection between the first connecting member 11 and the second connecting member 12. The connecting strength of the three groups of brittle connecting members 13 is sufficient for a firm connection between the first connecting member 11 and the second connecting member 12. The energy absorbing structure 10 forms a certain space in telescopic cavity 123, and the elastic buffer member 14 is arranged in the telescopic cavity 123. The greater the number of brittle connecting members 13, the greater will be the amount of impact energy absorbed by the breaking of the brittle connecting members 13. By arranging multiple groups of brittle connecting members 13, most of the impact energy is absorbed, and the remaining small residue of impact energy is absorbed by the elastic buffer piece 14.

In other embodiments, the brittle connecting members 13 may be symmetrically arranged at the connection between the first connecting member 11 and the second connecting member 12, and two or four groups or more of the brittle connecting members 13 can be arranged. The number of brittle connecting members 13 is unlimited, and these are evenly distributed at the connection between the first connecting member 11 and the second connecting member 12.

A display screen 20 includes a display 21, a connection structure 22, and an energy absorption structure 10. The connection structure 22 is arranged in the middle of the display 21 and the energy absorption structure 10. One end of the connection structure 22 is connected to the first connecting member 11. The connection structure 22 is connected to the display 21.

Further, in a display screen 20 of the present application, the display screen 20 uses an energy absorbing structure 10. When a collision occurs, the energy absorbing structure 10 collapses, and the energy absorbing structure 10 absorbs impact energy to achieve the effect of protecting the display 21.

In this embodiment, a connecting structure 22 is provided behind the display 21, and the connecting structure 22 is arranged at the center of the display 21. In a collision, the energy absorbing structure 10 collapses and absorbs the impact energy, so as to achieve the effect of protecting the display 21.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An energy absorbing structure comprising:
   a first connecting member comprising a first end portion, the first end portion defining a first accommodating cavity;
   a second connecting member comprising a second end portion, the second end portion defining a second accommodating cavity, the first connecting member being connected with the second connecting member, a part of the first end portion being disposed in the second end portion, and the first accommodating cavity communicating with the second accommodating cavity to form a telescopic cavity;
   a brittle connecting member, the first connecting member and the second connecting member being connected by the brittle connecting member, the brittle connecting member being breakable under impact to absorb energy generated by the impact; and
   an elastic buffering element arranged in the telescopic cavity, and the elastic buffering element being compressible by each of the first connecting member and the second connecting element to deform during the impact.

2. The energy absorbing structure according to claim 1, wherein the brittle connecting member is positioned at a connection portion between the first connecting member and the second connecting member, and the brittle connecting member comprises a first section and a second section, the first section is connected to the first connecting member, the second section is connected to the second connecting member, a connection area between the first section and the second connecting member is defined as a fracture area.

3. The energy absorbing structure of claim 2, wherein a strength of the fractured area is smaller than a strength of a remaining area of the brittle connecting member except the fractured area.

4. The energy absorbing structure of claim 3, wherein a thickness of the fractured area is smaller than a thickness of the remaining area of the brittle connecting member except the fractured area.

5. The energy absorbing structure of claim 3, wherein the brittle connecting member is defined with a stress groove, and the stress groove is defined in the fracture area.

6. The energy absorbing structure of claim 1, wherein a plurality of the brittle connecting members are positioned at a connection between the first connecting member and the second connecting member.

7. The energy absorbing structure of claim 1, wherein a first connection hole is defined in the first end portion, a second connection hole is defined in the second end portion, and the second connection hole communicates with the first connection hole, the brittle connection piece is arranged in the first connection hole and the second connection hole, the brittle connection piece is a plastic screw, and the elastic buffer piece is a spring.

8. The energy absorbing structure of claim 1, wherein the second connecting member further comprises a limiting structure, and the limiting structure is positioned at the second end portion away from the first connecting member, the limiting structure is fixed with the second end portion, the limiting structure is arranged in the telescopic cavity, and the limiting structure is configured for blocking the first end portion.

9. The energy absorbing structure of claim 1, wherein the energy absorbing structure further comprises a base, the base is provided with a cavity, and a clamping structure is positioned on an inner surface of the cavity, the second connecting member is fixedly connected with the clipping structure, or the second connecting member and the clipping structure are movably connected through a bearing.

10. A display screen comprising a display, a connecting structure and an energy-absorbing structure, the connecting structure is arranged in a middle of the display and the energy absorbing structure, and an end of the connecting structure is connected to the first connecting member, another end of the connecting structure is connected with the display, and wherein the energy absorbing structure comprising:
- a first connecting member, the first connecting member comprises a first end portion, and the first end portion defines a first accommodating cavity;
- a second connecting member, the second connecting member comprise a second end portion, the second end portion defines a second accommodating cavity, the first connecting member is connected with the second connecting member, a part of the first end portion is disposed in the second end portion, and the first accommodating cavity communicates with the second accommodating cavity to form a telescopic cavity;
- a brittle connecting member, the first connecting member and the second connecting member are connected by the brittle connecting member, the brittle connecting member is configured for breaking during a collision to absorb the energy generated by the collision; and
- an elastic buffering element is arranged in the telescopic cavity, and the elastic buffering element is configured to be compressed by the first connecting member and the second connecting element together to deform and absorb energy during a collision.

11. The display screen of claim 10, wherein the brittle connecting member is positioned at a connection portion between the first connecting member and the second connecting member, and the brittle connecting member comprises a firs section and a second section, the first section is connected to the first connecting member, the second section is connected to the second connecting member, a connection area between the first section and the second connecting member is defined as a fracture area.

12. The display screen of claim 11, wherein a strength of the fractured area is smaller than a strength of other areas of the brittle connecting member except the fractured area.

13. The display screen according to claim 12, wherein a thickness of the fractured area is smaller than a thickness of other areas of the brittle connecting member except the fractured area.

14. The display screen of claim 12, wherein the brittle connecting member is defined with a stress groove, and the stress groove is defined in the fracture area.

15. The display screen of claim 10, wherein a plurality of the brittle connecting members are positioned at a connection between the first connecting member and the second connecting member.

16. The display screen of claim 10, wherein a first connection hole is defined in the first end portion, a second connection hole is defined in the second end portion, and the second connection holes communicate with the first connection hole, the brittle connection piece is arranged in the first connection hole and the second connection hole, the brittle connection piece is plastic screw, and the elastic buffer piece is spring.

17. The display screen according to claim 10, wherein the second connecting member further comprises a limiting structure, and the limiting structure is positioned at the second end portion away from the first connecting member, the limiting structure is fixed with the second end portion, the limiting structure is arranged in the telescopic cavity, and the limiting structure is configured for blocking the first end portion.

18. The display screen according to claim 10, wherein the energy absorbing structure further comprises a base, the base is provided with a cavity, and a clamping structure is positioned on an inner surface of the cavity, the second connecting member is fixedly connected with the clipping structure, or the second connecting member and the clipping structure are movably connected through a bearing.

* * * * *